(12) United States Patent
Allard

(10) Patent No.: US 6,976,808 B2
(45) Date of Patent: Dec. 20, 2005

(54) CATCH BASIN FILTRATION SYSTEM WILL DISPOSABLE SILT/CONTAMINANT COLLECTOR

(75) Inventor: Douglas Paul Allard, Santa Rosa, CA (US)

(73) Assignee: Kristar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 10/072,877

(22) Filed: Feb. 12, 2002

(65) Prior Publication Data

US 2002/0071722 A1 Jun. 13, 2002

Related U.S. Application Data

(63) Continuation of application No. 09/384,832, filed on Aug. 27, 1999, now abandoned.

(51) Int. Cl.[7] .............................................. E01C 11/22
(52) U.S. Cl. .............................. 405/36; 405/43; 404/4; 210/163; 210/164
(58) Field of Search ...................... 404/2, 4, 5; 405/38, 405/43, 50, 36; 210/164, 165, 163

(56) References Cited

U.S. PATENT DOCUMENTS

| | | | |
|---|---|---|---|
| 705,447 A | 7/1902 | Sargent | |
| 809,201 A | 1/1906 | Lutz | |
| 1,507,531 A | 9/1924 | Vaudell | |
| 2,432,203 A | 12/1947 | Miller | 182/2 |
| 2,497,577 A | 2/1950 | Biggerstaff | 182/31 |
| 3,042,210 A | 7/1962 | Hattori | 210/163 |
| 4,419,232 A | 12/1983 | Arntyr et al. | 210/164 |
| 4,594,157 A | 6/1986 | McGowan | 210/163 |
| 5,062,735 A | 11/1991 | Gaudin | 404/25 |
| 5,232,587 A | 8/1993 | Hegemier et al. | 210/162 |
| 5,297,895 A | 3/1994 | Johnson | 405/41 |
| 5,345,741 A | 9/1994 | Slater et al. | 52/646 |
| 5,360,284 A | 11/1994 | Allard | 404/2 |
| 5,403,474 A | 4/1995 | Emery | 210/163 |
| 5,405,539 A | 4/1995 | Schneider | 210/47 |
| 5,480,254 A | 1/1996 | Autry | 404/2 |
| 5,498,331 A | 3/1996 | Monteith | 210/170 |
| 5,632,888 A * | 5/1997 | Chinn et al. | 210/163 |
| 5,632,889 A | 5/1997 | Tharp | 210/165 |
| 5,702,595 A | 12/1997 | Mossburg, Jr. | 210/163 |
| 5,720,574 A | 2/1998 | Barella | 405/52 |
| 5,725,782 A * | 3/1998 | Chinn et al. | 210/767 |
| 5,733,445 A | 3/1998 | Fanelli | 210/164 |
| 5,843,306 A | 12/1998 | Singleton | 210/163 |
| 5,916,436 A | 6/1999 | Devore | 210/163 |

(Continued)

FOREIGN PATENT DOCUMENTS

AU 29911 8/1996

OTHER PUBLICATIONS

International Search Report.

*Primary Examiner*—Robert E. Pezzuto
*Assistant Examiner*—Alexandra Pechhold
(74) *Attorney, Agent, or Firm*—Howrey LLP

(57) ABSTRACT

A catch basin filtration system is disclosed. A filter body is dimensioned to fit within an drain inlet forming a trough obstructing at least a portion of the inlet. The filter body is supported by a filter body support dimensioned to cooperatively engage with the interior walls of the inlet and with the filter body to substantially maintain said filter body in a pre-selected shape and position within the inlet. One or more connectors removably connect the filter body to the filter body support.

7 Claims, 11 Drawing Sheets

U.S. PATENT DOCUMENTS

| | | | |
|---|---|---|---|
| 5,935,450 A | 8/1999 | Benedict | 210/776 |
| 5,958,226 A * | 9/1999 | Fleischmann | 210/165 |
| 5,980,740 A | 11/1999 | Harms | 210/162 |
| 5,985,157 A | 11/1999 | Leckner et al. | 210/747 |
| 6,010,622 A | 1/2000 | Chinn et al. | 210/164 |
| 6,045,691 A * | 4/2000 | McDermott | 210/164 |
| 6,059,966 A | 5/2000 | Brandhofer et al. | 210/232 |
| 6,080,307 A * | 6/2000 | Morris et al. | 210/163 |
| 6,093,314 A | 7/2000 | Wilson et al. | 210/99 |
| 6,149,803 A | 11/2000 | DiLoreto, Jr. et al. | 210/164 |
| 6,261,445 B1 | 7/2001 | Singleton | 210/163 |
| 6,531,059 B1 * | 3/2003 | Morris et al. | 210/164 |

* cited by examiner

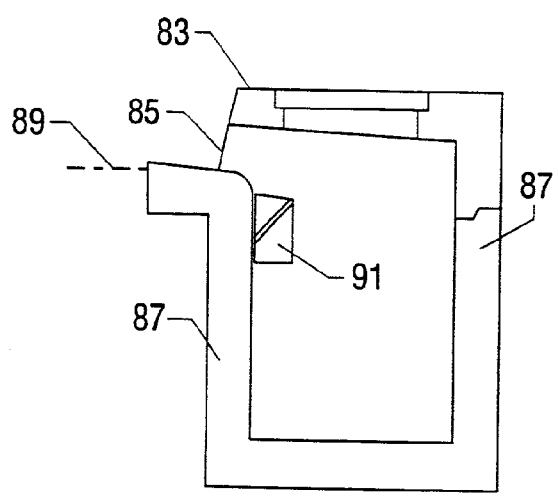
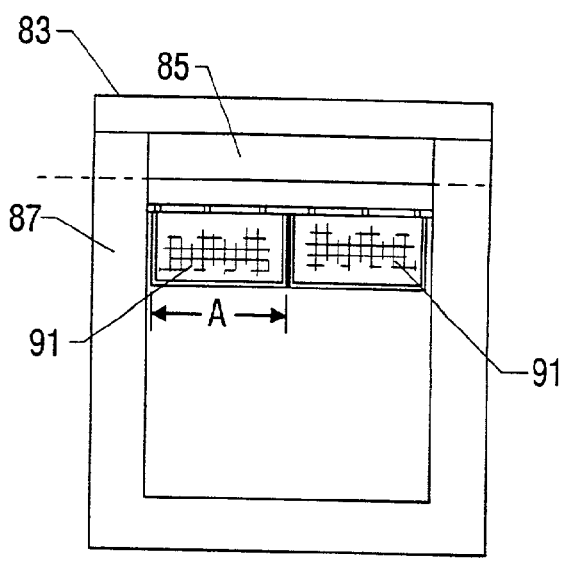
FIG. 17  FIG. 18
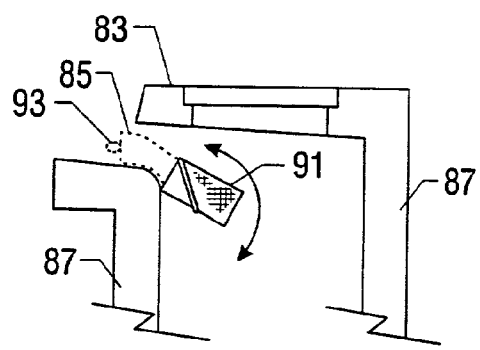
FIG. 19

CATCH BASIN FILTRATION SYSTEM WILL DISPOSABLE SILT/CONTAMINANT COLLECTOR

NOTICE OF PRIORTY

The present application is a continuation of and claims priority from U.S. application Ser. No. 09/384,832, filed Aug. 27, 1999, now abandoned, which application is commonly assigned and which is hereby incorporated herein in its entirety by reference.

FIELD OF THE INVENTION

The present invention relates to drain inlets and structures for use in drain inlets to inhibit the flow of pollutants, debris and other contaminants into drainage systems.

BACKGROUND OF THE INVENTION

Drainage systems for receiving fluid flow are well known in the art. Such systems provide a path for fluid flow from surface areas and often transport the fluid from surface areas directly to the ocean, rivers, lakes, estuaries, streams and the like without regard to the removal of debris, pollutants or other contaminants. For example, because of the Federal Environmental Protection Agency's Clean Water Act, controlling pollution from storm water runoff is receiving ever-increasing attention at all levels of government, Federal, State and local. Federal and state agencies have issued mandates and developed guidelines regarding the prevention of non-point source (storm water caused) pollution that require local governments to act upon or initiate.

Because of the aforementioned mandates, many cities and special districts have developed plans and taken action to prevent storm water pollution. These actions range from those that are educational in nature (labeling storm water inlets with phrases such as "No dumping—Flows into Rivers and Streams") to active measures to remove pollutants. Such measures generally require the installation of equipment for removing contaminants somewhere between where the storm water enters the drainage system and the ultimate body of water receiving the runoff.

Several types of equipment are employed to reduce pollution and contaminants from storm water runoff. Catch basin filtration systems use devices installed at the point that the storm water enters the drainage system. The water flow is directed through an installed adsorbent material that aids in removing contaminants from the storm water while allowing the water to flow into the drainage system. Such a permanently installed catch basin filtration system is disclosed in U.S. Pat. No. 5,720,574. In addition to catch basin filtration systems, oil/water separators are employed. Such systems generally comprise large underground holding tanks that allow silt and pollutants to settle to the bottom of the tank and the water to flow into the drainage system. Other systems also exist to remove contaminants from water runoff. However, these systems are also generally permanent installations that are expensive to install and maintain. Accordingly, filtration systems for drainage systems that are cost effective and easily maintained are desired.

SUMMARY OF THE INVENTION

The present invention is directed to a disposable or re-useable catch basin filtration system that is effective and economical to install and maintain. Generally, the apparatus comprises a filter body dimensioned to fit within an inlet and forming a trough obstructing at least a portion of the inlet. The filter body is supported by a filter body support dimensioned to cooperatively engage with the inlet and the filter body to substantially maintain the filter body in a preselected shape and position with the inlet. One or more connectors removably connect the filter body to the filter body support.

In one embodiment, the filter structure comprises a filter body made of a tough, permeable material, such as a woven geotextile material. The filter body forms a trough that is supported in a drain inlet by a supporting structure, such as a steel frame, to maintain the filter body in the desired shape for receiving fluid flow entering the drain inlet. The filter body allows fluid, such as water runoff, to pass through while inhibiting the flow of debris and sedimentation contained in the runoff through the filter body. In addition, one or more adsorbent containers can be placed in the filter body to remove pollutants or contaminants from fluid flowing through the filter body. For example, the adsorbent containers, such as a permeable pouch, may contain adsorbents for removing hydrocarbons from fluid flowing through the filter body.

In another embodiment, the filter body is supported in the inlet and forms a trough around the perimeter of the inside wall of the inlet. The interior wall of the trough forms a dam that is lower than the outer wall of the trough. Adsorbent pouches can be preferably removably attached, such as by VELCRO®, any similar hook and loop fastener, or other removably attaching means as would be readily understood by one skilled in the art, to the outer wall and the dam of the trough. During periods of fluid flow, such as storm water runoff, the fluid flows into the inlet and enters the filter body. As the level of the water rises in the filter body, it causes the adsorbent pouches to float. As the pouches float, the fluid is exposed to the adsorbent thereby allowing contaminants to be removed from the fluid. When fluid completely fills the filter body, the fluid flows over the dam and into the drainage system.

One feature of the present invention is the ability to easily remove the filter body, the adsorbent pouch, or both from the inlet. This provides the advantage of easily servicing the filtration system by removing the filter body or adsorbent pouches for cleaning or replacement.

BRIEF DESCRIPTION OF THE DRAWINGS

FIG. 17 is a side view of a curb inlet having an alternative embodiment of the present invention situated therein.

FIG. 18 is a front view of a curb inlet having an alternative embodiment of the present invention situated therein.

FIG. 19 is a side view illustrating the operation of the alternative embodiment illustrated in FIGS. 17 and 18.

DETAILED DESCRIPTION OF THE INVENTION

The present invention relates to drain inlets adapted to receive fluid flow or run-off. Such inlets take a variety of forms, for example curb openings, inlets or drains; drop inlets, combination inlets (e.g., curb inlets combined with drop inlets) and the like. Absent a barrier, fluid will flow unimpeded into the inlet and through the drainage system. Such drainage systems generally empty into a variety of geological formations such as bays, estuaries, rivers, lakes, or underground aquifers. The present invention is directed to a filter assembly that is easily cleaned and reused or easily removed and disposed of as circumstances warrant.

Generally, the present invention comprises a filter body supported by a filter body support. Generally the filter body support will comprise a frame from which the filter body is suspended. The frame is configured to support the filter body in the desired shape and position. In addition, the frame is configured to cooperatively engage with an inlet to hold the filter body in the correct position relative to the inlet. The filter body support also includes any other filter body supporting structures such as brackets and the like that aid in maintaining the filter body in the desired shape and position.

Figure 1:
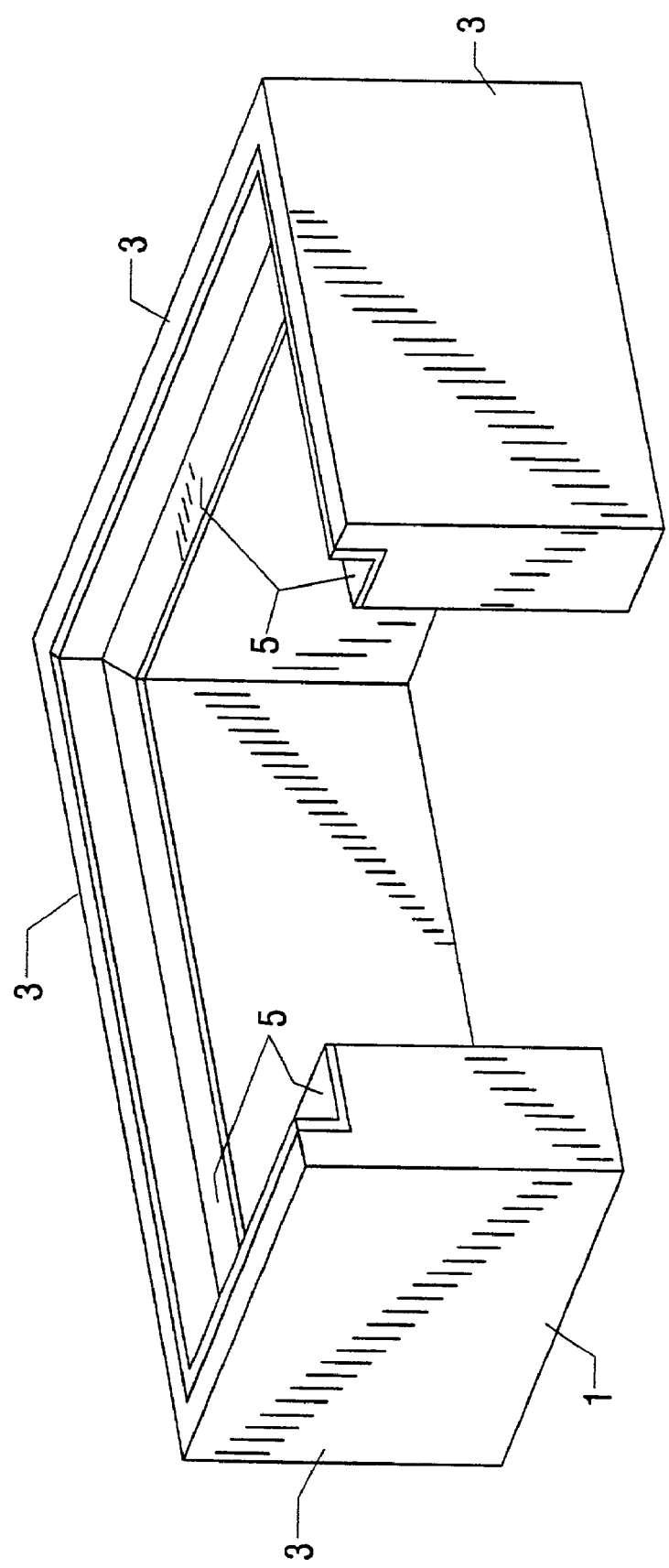
FIG. 1 is a cut-away perspective view of a grate inlet structure.

Referring to FIG. 1, a grate inlet structure 1 is illustrated having sides 3 and upper load bearing surfaces 5. Generally, the grate inlet structure is composed of concrete and situated below the surface such that the top portions of the sides are approximately even with the surface level, for example with a road surface, pavement or the like. A grate (not shown) will typically be situated in the inlet and rest on the load bearing surfaces 5.

Figure 2:
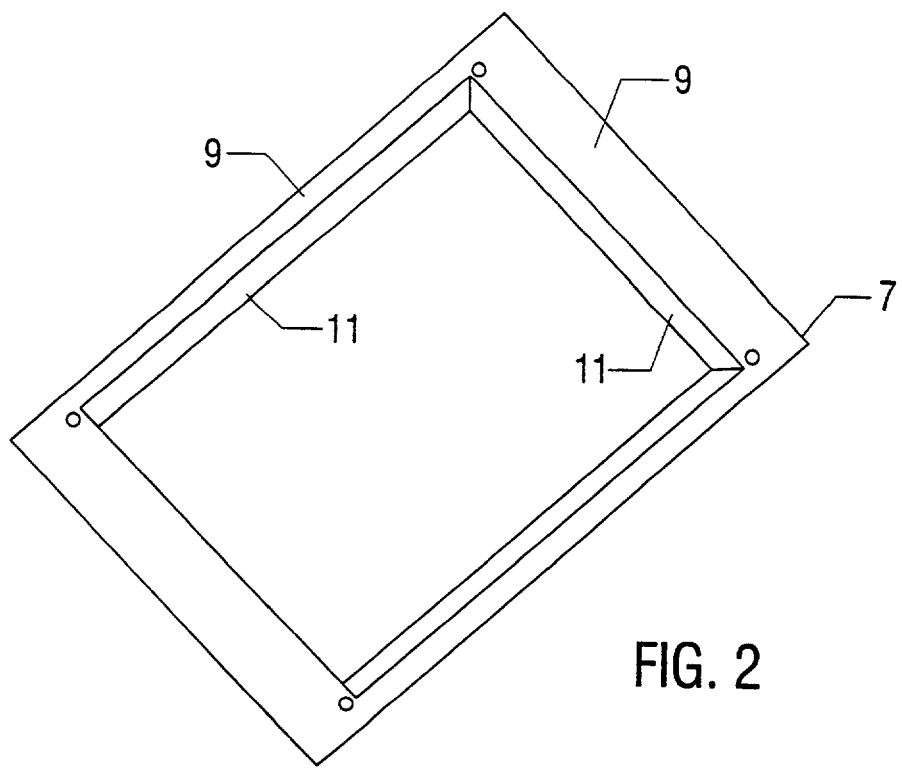
FIG. 2 is a top perspective view of one embodiment of a frame structure of the present invention.
Figure 3:
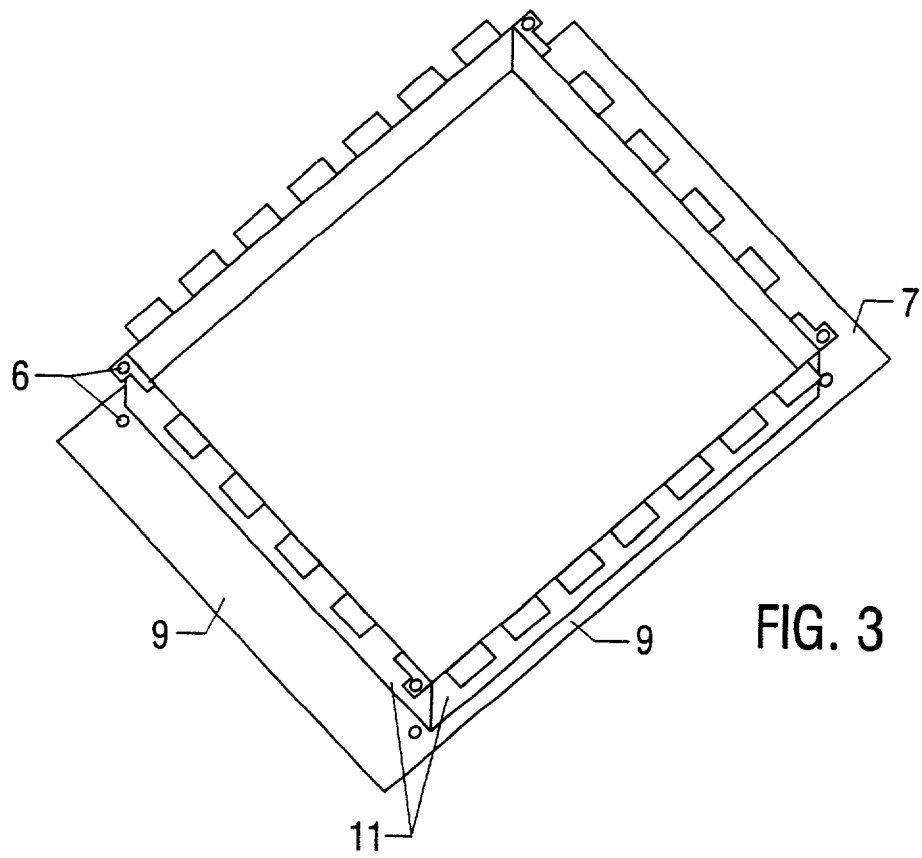
FIG. 3 is a bottom perspective view of the frame structure illustrated in FIG. 2.

Referring to FIGS. 2 and 3, a frame according to one embodiment of the present invention is illustrated. FIG. 2 shows a top perspective view of frame 7 and FIG. 3 shows a bottom perspective view of frame 7. Frame 7 is illustrated having a flange 9 extending perpendicularly from frame wall 11. In practice, frame 7 is situated in the grate inlet structure 1 illustrated in FIG. 1 such that the flange 9 rests on upper load bearing surface 5. The grate (not shown) can then be placed into the grate inlet structure such that the grate rests on top of flange 9 to further secure the frame in place.

Figure 4:
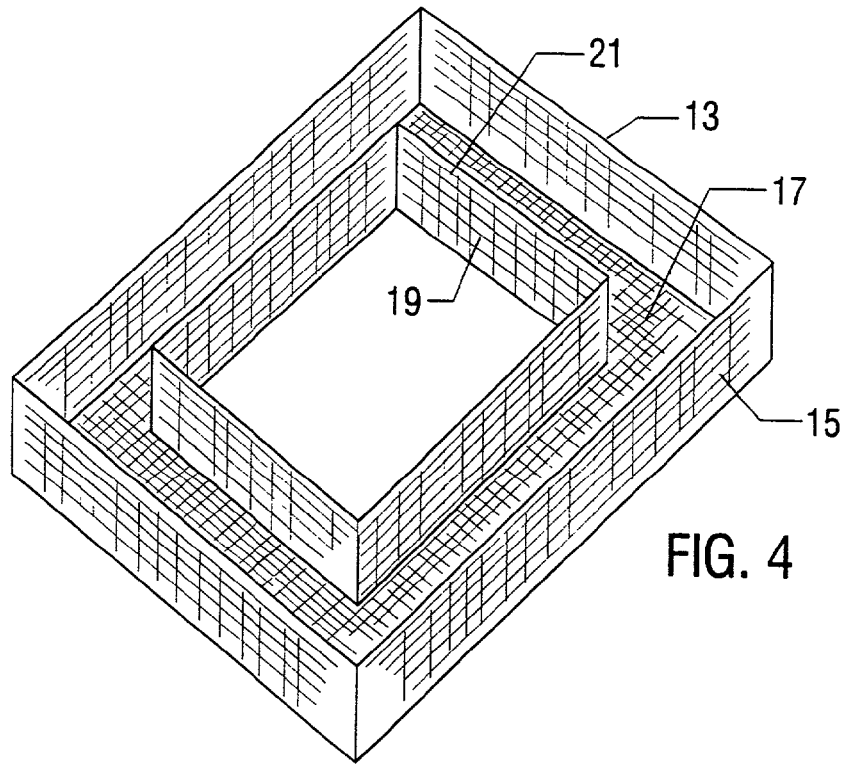
FIG. 4 is a perspective view of an illustration of one embodiment of a filter body of the present invention.

As indicated, the frame serves as at least one portion of the filter body support. Referring to FIG. 4, a filter body 13 illustrating one embodiment of the present invention is shown. As illustrated, filter body 13 comprises a filter body wall 15, filter body floor 17, dam 19 and wier 21. A variety of terms can be used to describe the general shape of the filter body, such as trough, pocket, basket, catch basin and the like.

The filter body captures and substantially retains sedimentation and debris, and so is shaped, as indicated, as a trough. The position of the filter body in the inlet depends on the particular inlet. The filter body may be adjacent the top portion of an inlet or catch basin. It may positioned adjacent a portion of the inside wall of the inlet or around the perimeter of the upper portion of the inlet where it can be maintained.

As indicated, one purpose of the filter body is to capture and substantially retain material carried by a fluid, such as sedimentation and debris carried in water run-off, while letting the fluid itself pass through. Accordingly at least a portion of the filter body it constructed of perforated or porous materials. For example, the entire filter body may comprise such perforated or porous material, or may comprise perforated material in combination with non-perforated material. The perforated or porous material may be constructed of screen, netting, or woven materials such as cloth materials. The type of material used to construct the perforated portions of the filter body may be of any suitable material strong enough for the environment in which the filter will be employed, i.e., strong enough to retain sedimentation and debris contained in fluid flow without breaking. Examples of such materials include plastic or metal screening or netting, sturdy woven materials and the like. In addition, stiffeners may be added to the filter body materials such as metal or plastic strips that can be inserted into sleeves or loops contained in the filter body, or metal or plastic strands woven directly into the filter body material. A particularly preferred material for constructing the filter body is a woven geotextile material such as GEOTEX™ 117 or 111F woven monofilament manufactured by Synthetic Industries, Chattanooga, Tenn. Although the size of the perforations is not critical, the perforations should be of a size to accomplish the desired debris or sediment control. Larger openings may be incorporated into the filter body material if desired to allow for a high fluid flow bypass.

As indicated, the filter body may be entirely constructed of a perforated or porous material, or constructed of a combination of porous and non-porous materials depending on the application in which the filter body is to be employed. For example, referring to FIG. 4, the filter body wall 15 may be constructed of a non-porous material, such as a plastic material, such as a plastic film or sheet, or a combination of porous and non-porous materials. Similarly the dam 19 may be constructed of a non-porous material, or a combination of porous and non-porous materials. The filter body floor 17 will preferably be constructed of a porous material, but may include a combination of porous or non-porous materials, especially where materials are included in the filter body floor to increase the strength of the structure.

As indicated, stiffening materials may be incorporated into the filter body to add strength and to aid in maintaining the filter body in the desired shape. For example, to add strength and to aid in keeping the dam 19 in the desired shape, especially under fluid flow conditions, stiffening materials can be incorporated into the dam. Particularly preferred is the incorporation of stiffening materials along the periphery of the dam just below the weir 21. The stiffening materials may be of a variety of types, such as metal or plastic strips or rods that can be inserted into sleeves or loops located at strategic points in the filter body. For example, they may be positioned as discussed above along the periphery of the dam 19 below weir 21, or the stiffening materials may be comprised of materials that can be directly woven into the filter body material, such as a metal thread woven into the filter body material.

Figure 5:
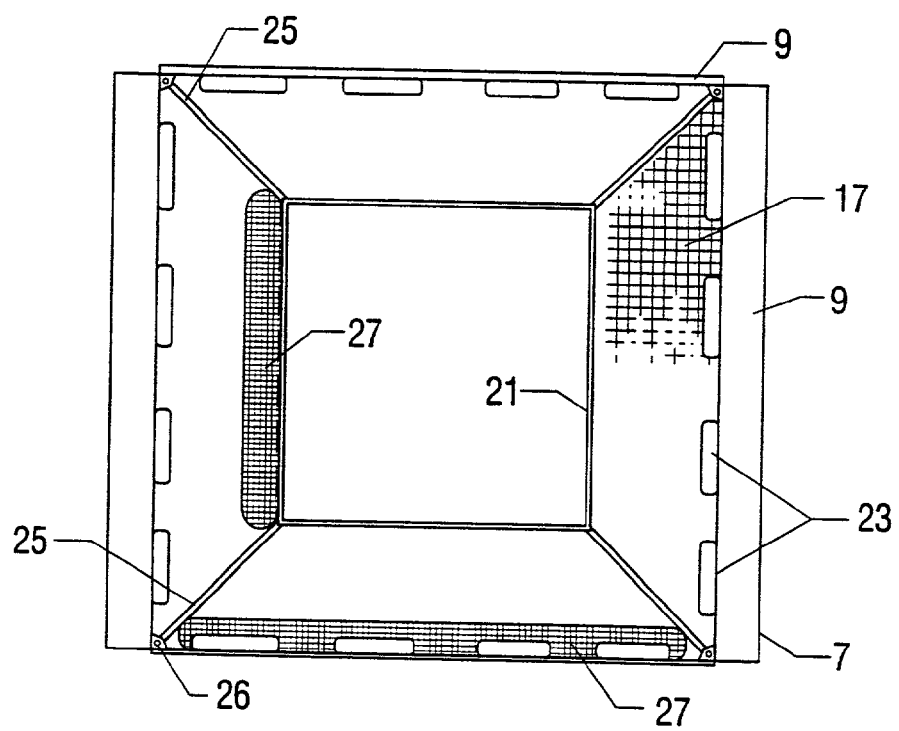
FIG. 5 is a top view of a frame and filter combination according to one embodiment of the present invention.
Figure 6:
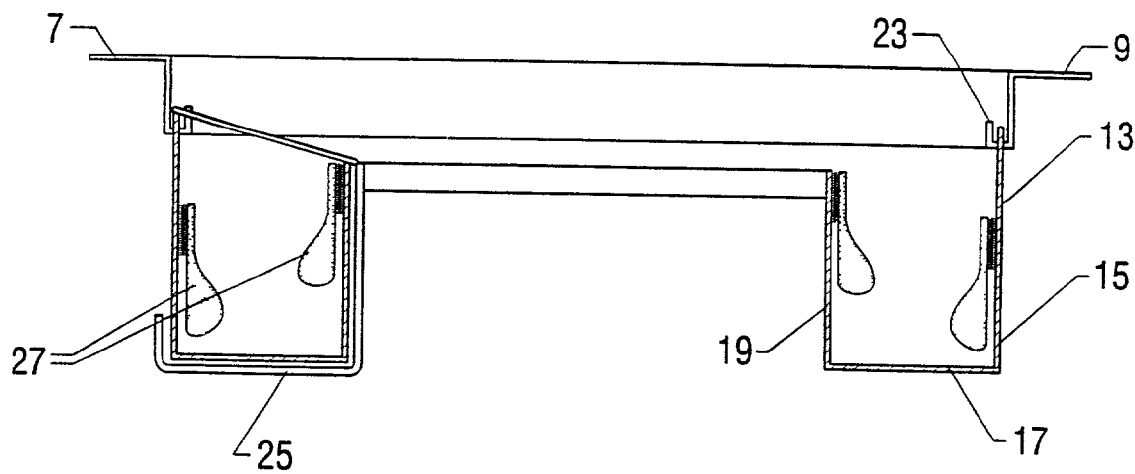
FIG. 6 is a side cut-away view of the frame and filter combination of FIG. 5.

Referring to FIGS. 5 and 6, a top and cut-away side view of one embodiment of the filter body and frame combination is illustrated. The filter body 13 is shown attached to the frame 7 using filter body attachment members 23 such as tabs, ribs, rails or the like. The attachment members 23 (here shown extending inward from the frame) can be inserted into corresponding openings, such as slits, along the upper periphery of filter body wall 15 to suspend the filter body from the frame 7. If desired, corresponding retaining members such as rods, clamps and the like can be attached to the attachment members to further secure the filter body in place. Filter body support brackets 25 are attached at the corners of the frame 7 and extend across the filter body 13, over weir 21, down the dam 19 and under the floor 17 to provide additional support to the filter body and to aid in maintaining the filter body in the desired shape. To assist in maintaining the dam in the desired shape, the bracket may be inserted through loops (not shown) positioned along the weir. The support brackets may be configured in a variety of ways. For example, the brackets may configured to completely traverse the frame to form an X shape. The filter body can then be attached to the brackets using corresponding loops or sleeves located on the filter body.

As indicated, one purpose of the frame is to support the filter body in the drain inlet. Another purpose is to aid in holding open the filter body in the desired shape. The filter body may be attached to the frame using any desirable connecting method such as snaps, screws, rivets, buttons, tabs, hooks, clamps, drawstrings and the like. Preferably, the connector or fastener employed will allow the filter body to be removably engaged with the frame such that the filter body can be replaced when necessary.

The filter body may be attached to the frame at points internal or external of the frame. For example, referring to FIG. 3, the frame 7 is shown having externally mounted attachment members 29 that allow for attachment of a corresponding filter body to the outside of the frame.

One or more adsorbent containers can be attached to the interior of the filter body. Such containers are of a permeable material, such as a net pouch, bag or the like. The adsorbent containers are filled with an adsorbent material. One example of an adsorbent material is an inert inorganic blend of amorphous siliceous material containing sodium, potassium and aluminum silicates. The adsorbent containers can be attached in a variety of ways to the interior of the filter body, such as by clips, snaps, loops, VELCRO® or any similar hook and loop fastener and the like. In a preferred embodiment, the adsorbent containers are removably attached to the interior walls of the filter body such that as the filter body fills with fluid, the adsorbent containers float, exposing the fluid to the adsorbent material contained therein. As illustrated in FIGS. 5 and 6, adsorbent containers 27 are situated along the outer wall of the filter body; and along the interior of the dam.

Figure 7:
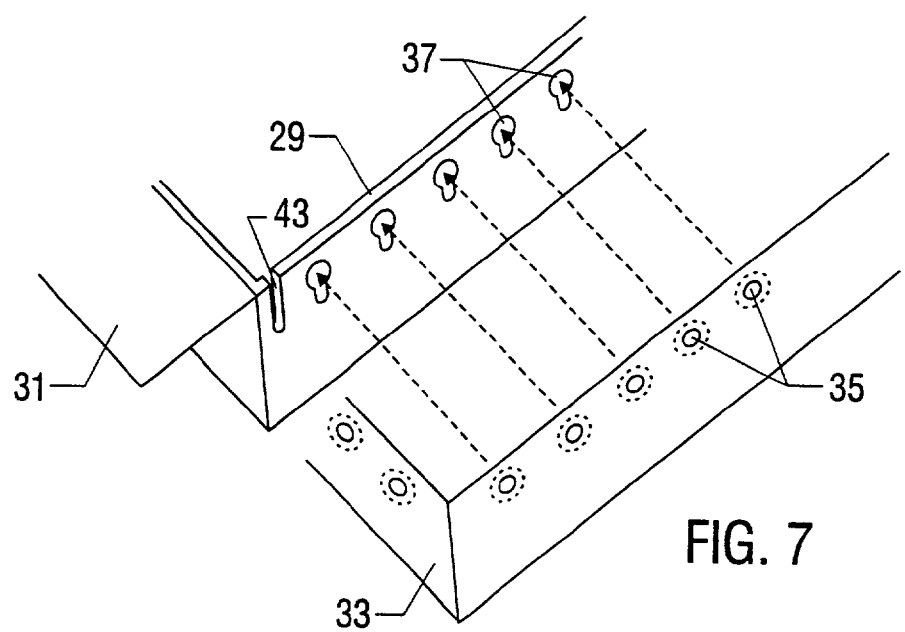
FIG. 7 is a partial perspective view illustrating one embodiment of a filter body and frame mounting system of the present invention.
Figure 8:
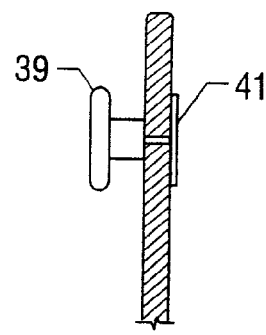
FIG. 8 is a side view of a filter body connector used in the mounting system of FIG. 7.
Figure 9:
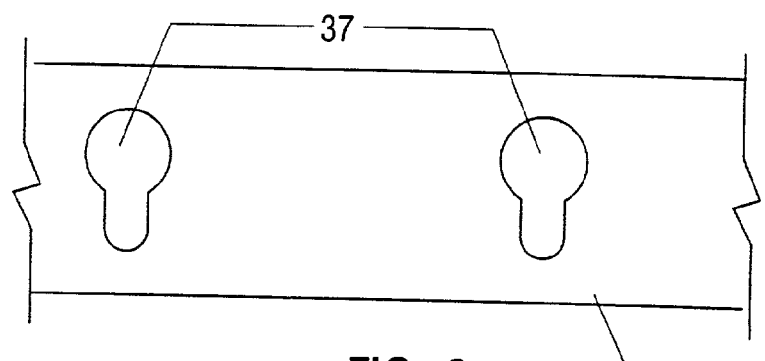
FIG. 9 is a partial side view of a frame for use in the frame mounting system of FIG. 7.
Figure 10:
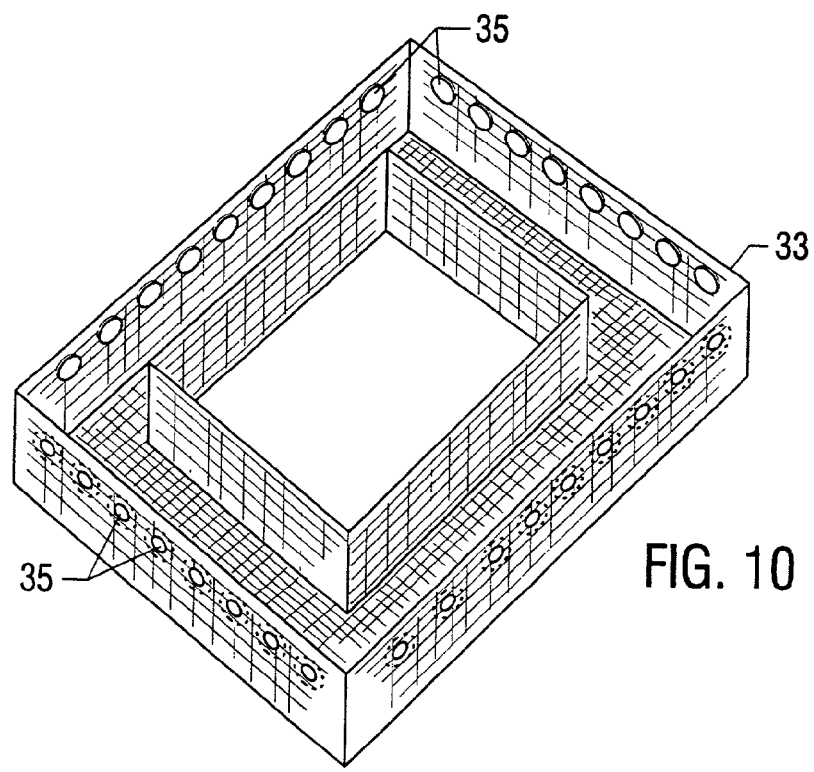
FIG. 10 is a perspective view of one embodiment of a filter body illustrating the filter body connectors of FIG. 8 along the upper periphery of the filter body.

Referring to FIGS. 7–10, an especially preferred filter body attachment method is illustrated. Frame 29 is shown having flange 30. A corresponding filter body 33 is shown having attachment members 35 situated along the periphery of the filter body. The attachment members 35 are designed to fit through corresponding openings 37 situated along the periphery of frame 29. The attachment members can be of any desired shape such that they may extend through the openings and be lodged in place. Preferred attachment members in this embodiment are fasteners such as buttons, tabs, rivets and the like that are configured for corresponding engagement with openings in the frame. Referring more particularly to FIG. 8, an attachment member is illustrated having a frame attachment portion 39 and a filter body attachment portion 41 that extends through the filter body 33 and secures the attachment member to the filter body. Referring more particularly to FIG. 9, the attachment member can then be inserted into corresponding opening 37 in frame 29. The attachment members may be configured such that the filter body is attached to the inside of the frame by, for example, reversing the orientation of the attachment member.

As indicated previously, a support bracket is preferably employed to assist in holding open the filter body in the desired position. Accordingly, a support bracket is dimensioned to cooperatively engage with the filter body to hold it open in the desired shape and to cooperatively engage with the inlet to hold the filter body in the desired position. The support bracket may take a variety of forms. It may be internal of the filter body itself, such as stiffening materials woven into the filter body, such as ribs, rods, and the like. In addition, support brackets may include male and female members slidably engaged with each other to allow adjustment for accommodating inlets, frames and filter bodies of various sizes.

As illustrated in FIG. 3, support bracket attachment points 6 are shown. As illustrated in FIG. 5, the upper end of support bracket 25 is retained in attachment point 26. As illustrated in FIG. 6, the support bracket may be retained by the filter body attachment member 23. In either case, in the embodiments illustrated, the bracket extends across the filter body, down the dam and under the filter body floor, and then extends upward such that the lower end of the bracket 25 can be wedged between the filter body and the wall of the inlet.

Figure 11:
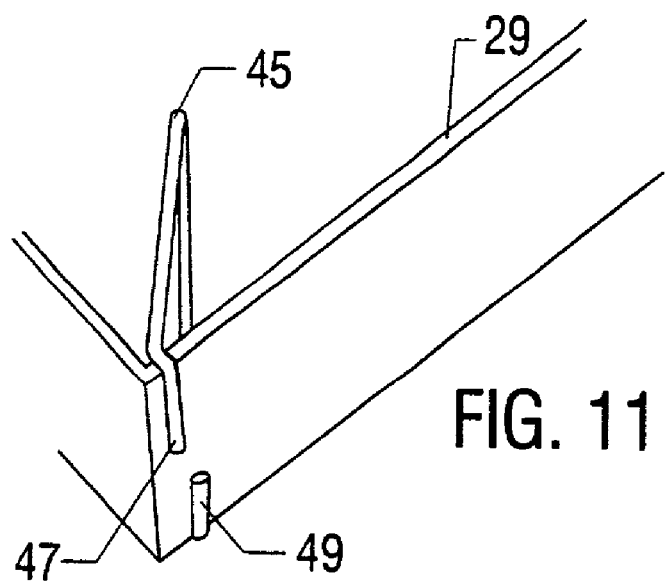
FIG. 11 is a partial perspective view of a frame and one embodiment of a filter body support bracket.

An especially preferred bracket attachment mechanism is illustrated in FIGS. 7 and 11. Referring to FIG. 7, frame 29 has bracket retaining slot 43. Referring to FIG. 11, support bracket 45 is shown having a first end 47 and a second end 49. The upper end rests in slot 43. The lower end extends upward along the outside of the frame 29 and is wedged between the frame and the inside wall of the inlet.

Figure 12:
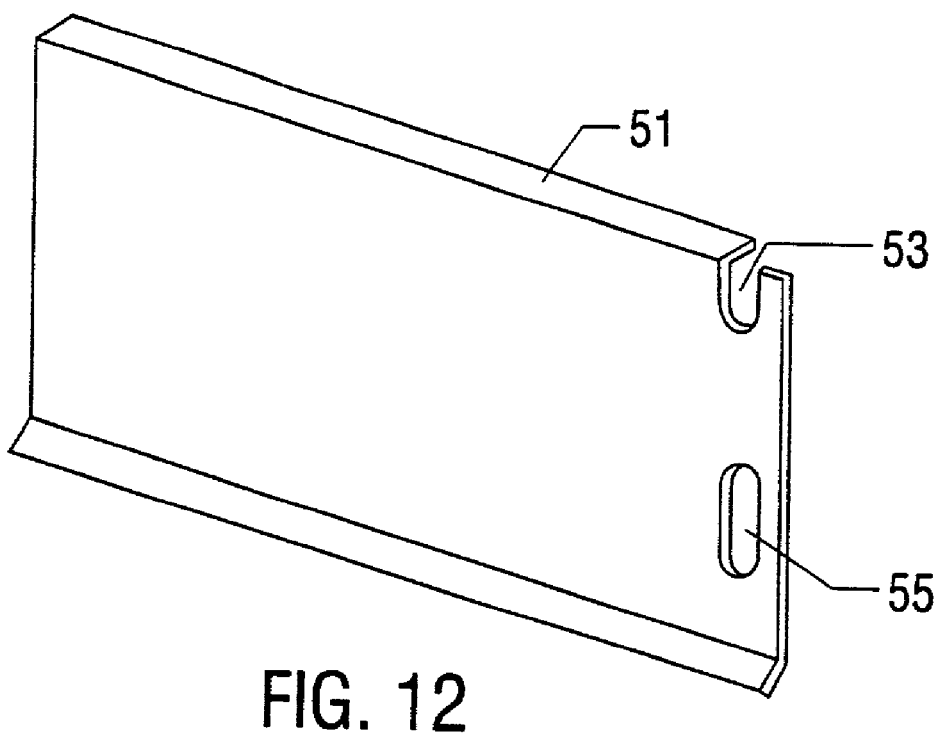
FIG. 12 is a partial perspective view of a frame having an alternative embodiment for attaching a filter body support bracket.
Figure 13:
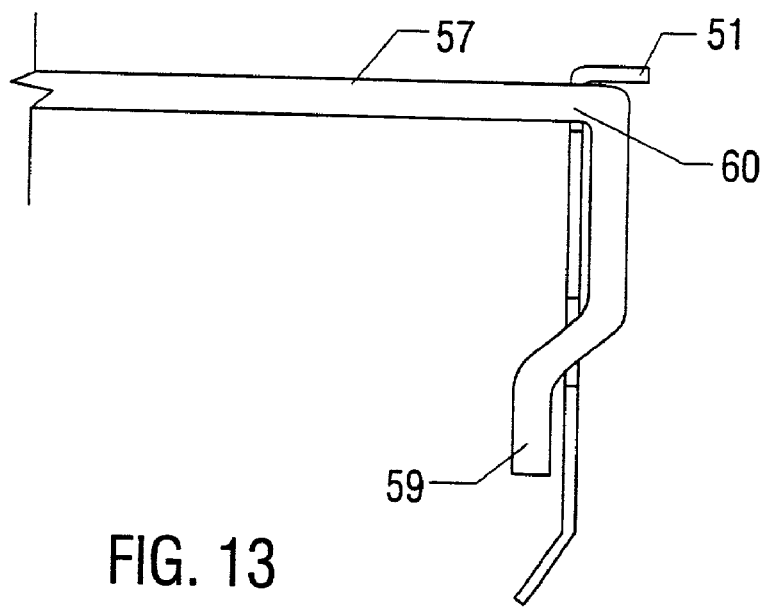
FIG. 13 is a partial side view of the frame of FIG. 12 and an alternative embodiment of a filter body support bracket mounted therein.
Figure 14:
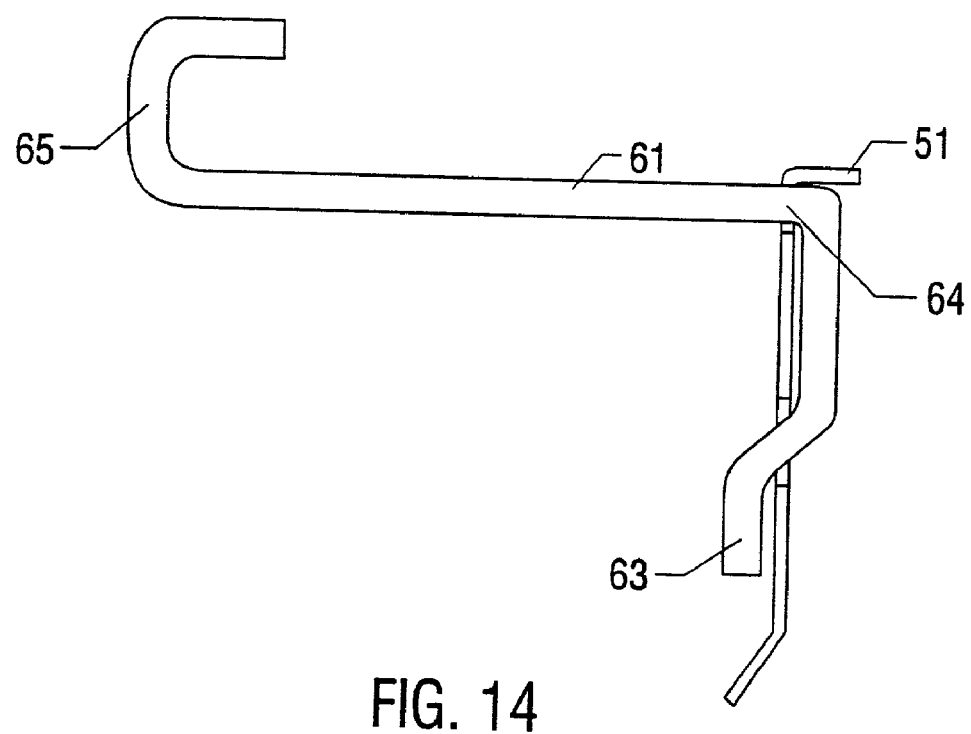
FIG. 14 is a side view of a filter body support bracket mounted in the frame illustrated in FIG. 12.

Referring to FIGS. 12–14, another preferred embodiment is illustrated for attaching a support bracket to a frame. FIG. 12 illustrates a frame 51 having a first opening 53 and a second opening 55. Referring to FIG. 13, a support bracket 57 configured to rest in corresponding openings 53 and 55 is shown wherein a first end 59 of support bracket 57 is inserted into corresponding opening 55. A support bracket mid portion 60 is then inserted into corresponding opening 53. A second end of the support bracket (not shown) may then extend across the filter body and attach to the filter body at strategic locations in order to retain the filter body in the desired shape. A particularly preferred attachment mechanism is illustrated in FIG. 14 wherein a support bracket 61 is illustrated having a first end 63 inserted into a corresponding opening in frame 51 and a support bracket mid portion 64 resting in a corresponding opening also in frame 51. An upwardly oriented second end 65 passes through a filter body attachment member (not shown), such as a loop, to assist in retaining the filter body in the desired open position.

The support bracket may be attached to the filter body at strategic attachment points, such as through a loop situated on the weir. Alternatively, the bracket may be incorporated into the filter body itself, such as sufficiently rigid material woven into the filter body to hold the body open in the desired position, or passed through sleeves in the filter body. In addition, the support brackets may include male and female members slidably engaged with each other such that the brackets can be adjusted to accommodate differences in filter body sizes and to make adjustments in the field where necessary.

Figure 15:
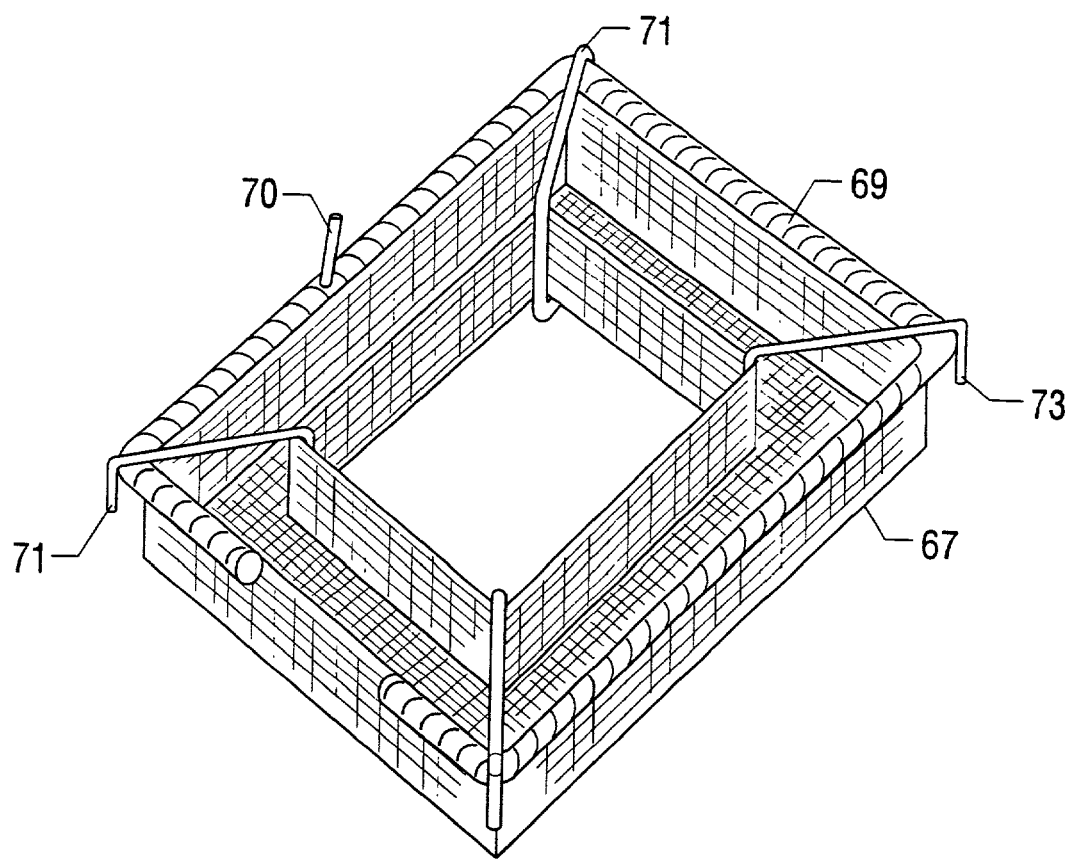
FIG. 15 is a perspective view of an alternative embodiment of a filter body illustrating the use of an inflatable bladder situated along the outer perimeter of the filter body.
Figure 16:
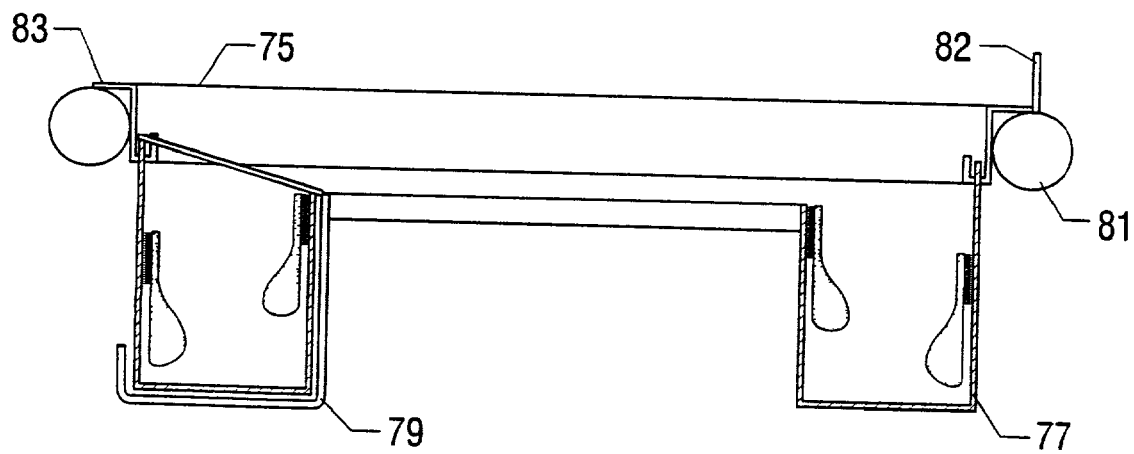
FIG. 16 is a side view of a frame and filter body combination employing an inflatable bladder situated along the outer perimeter of the frame.

In certain applications it may be desirable to position the filter body in the inlet below the load bearing surfaces (as illustrated in FIG. 1) of the inlet, or in cases where no structure exists in the inlet on which to rest the frame. Referring to FIGS. 15 and 16, an alternative embodiment is illustrated wherein an inflatable member, such as an air bladder is situated along at least a portion of the perimeter of the filter body, either inside or outside of the filter body. The filter body is positioned in the inlet in the desired location and the member inflated such that the member is urged against the inside wall of the inlet, securing the filter body in position. Referring to FIG. 15, a filter body 67 is illustrated having inflatable member 69 extending along the outside perimeter of the filter body. Corner brackets 71 are used in conjunction with the inflatable member to assist in holding the filter body in the desired open position. The inflatable member may be attached to the filter body by any suitable mechanism, such as sewn to the filter body or inserted into loops or sleeves in the filter body. In addition, the support brackets may be inserted into loops or sleeves in the filter body and inflatable member to secure the brackets in place. As discussed above, one or more ends of the support brackets may be secured in place by positioning them between the filter body and the inside wall of the inlet. For example, as illustrated in FIG. 15, end 73 may be positioned such that it extends to the outside of the filter body and the inflatable member. Inflating the member, for example through valve 70, will wedge the support bracket between the inflatable member and the inside wall of the inlet, assisting in securing the support bracket in place.

Referring to FIG. 16, an alternative embodiment is illustrated wherein the inflatable member is used in conjunction with a frame. As shown, frame 75 is combined with a filter body 77 and support brackets 79 as earlier described. An inflatable member 81 is positioned such that it extends along the outside perimeter of the frame such that flange 83 rests on top of inflatable member 81. As earlier described, the inflatable member can be inflated through valve 82 such that the inflatable member is urged against the inside wall of the inlet, thereby securing the frame and filter body in place. In addition to inflating the member with a gas, the member may be inflated with other materials such as an expandable foam material.

FIGS. 17–19 illustrate another embodiment of the present invention installed in a curb inlet. A curb inlet 83 is illustrated having curb opening 85 and curb inlet wall 87. Generally, the lower portion of the opening 85 corresponds to the level of the surface 89 adjacent the curb inlet, such as pavement. One or more filter body members 91 extend along the inside surface of wall 87 adjacent the curb opening 85. At least a portion of fluid or debris flowing into opening 85, such as water run-off, will pass through one or more of the filter bodies 91 disposed in the inlet. As illustrated more particularly in FIG. 19, filter body member 91 can be rotated upwards and the filter body itself turned inside out, such as by pulling upwards on a loop 93 disposed within the filter body, in order to remove solids retained within the filter body member.

Figure 20:
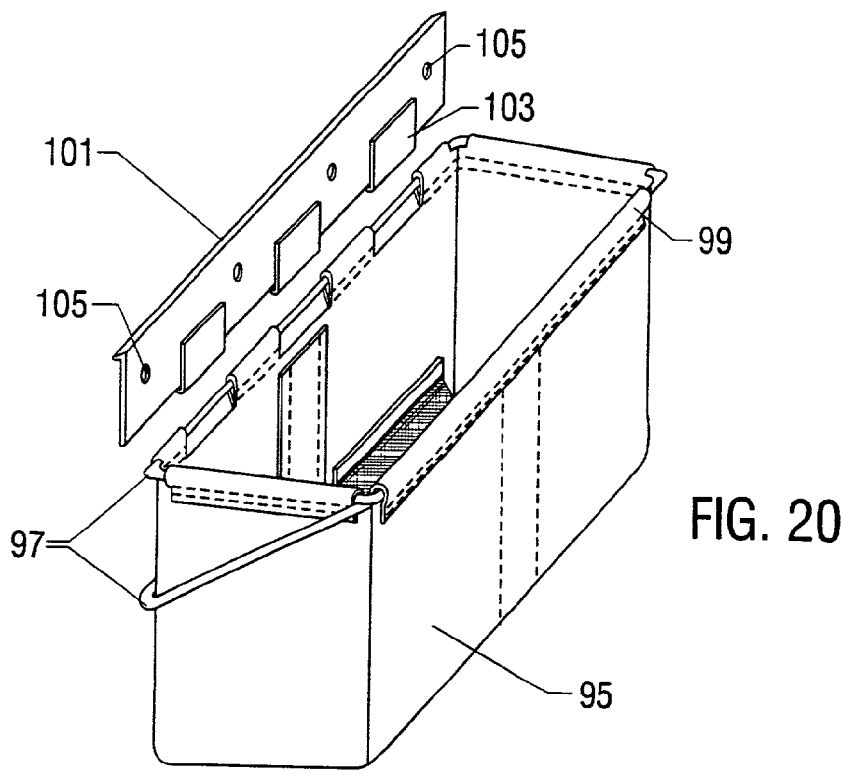
FIG. 20 is a perspective view of a frame and filter body combination illustrating an alternative embodiment of the present invention.
Figure 21:
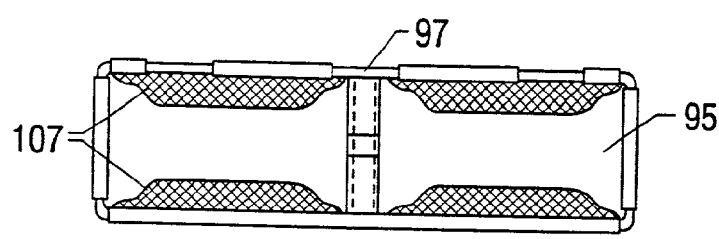
FIG. 21 is a top view of the embodiment illustrated in FIG. 20.
Figure 22:
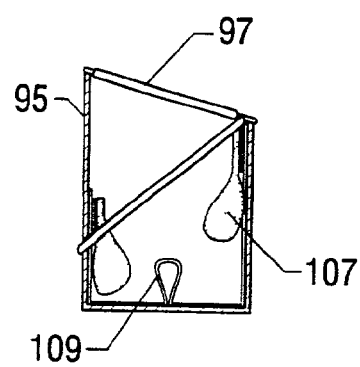
FIG. 22 is a side view of the embodiment illustrated in FIG. 20.

In general, the filter body member comprises a filter body, a frame adapted to hold the filter body in the desired position, and one or more attachment members for attaching the filter body to the frame and the frame and filter body to the inlet. FIGS. 20–22 illustrate a particularly preferred filter body member for use in a curb inlet. A filter body 95 is attached to frame 97 using sleeves 99 through which the frame is passed. A frame attachment member 101 is adapted for attaching the frame and securing the attachment member to the inside wall of a curb inlet. As illustrated, frame attachment member 101 is illustrated having frame mounting members 103 for securing the frame 97 to the frame attachment member. Openings 105 are included in the frame attachment member for anchoring the frame attachment member to the inside wall of the curb inlet. Referring more particularly to FIGS. 21 and 22, the filter body 95 includes one or more filter members 107. The filter members are designed to hold filtration media as previously described, and can comprise any suitable permeable container such as pouches, pockets and the like. A loop 109 may be incorporated into the filter body to assist in pulling the filter body member up and inside out to facilitate removal of solids, to remove and replace filter members, or to replace the filter body.

Figure 23:
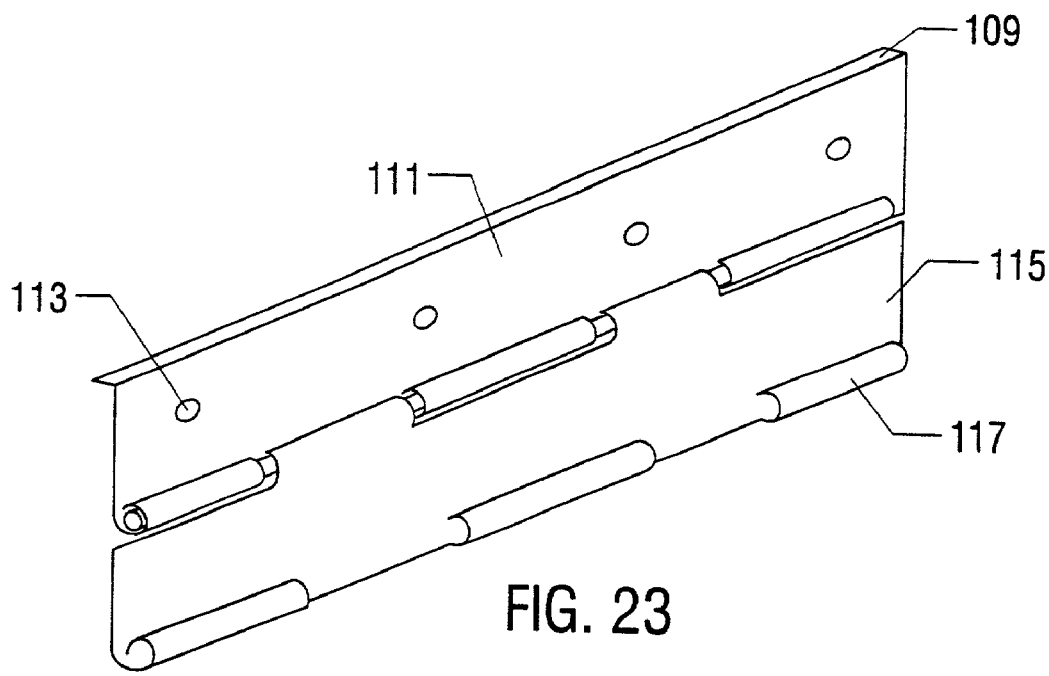
FIG. 23 is a perspective view illustrating one embodiment of a filter body mounting bracket.
Figure 24:
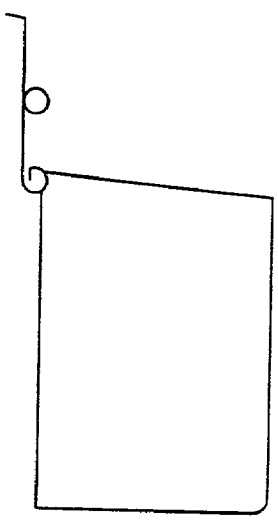
FIG. 24 is a side view of the mounting bracket illustrated in FIG. 23.
Figure 25:
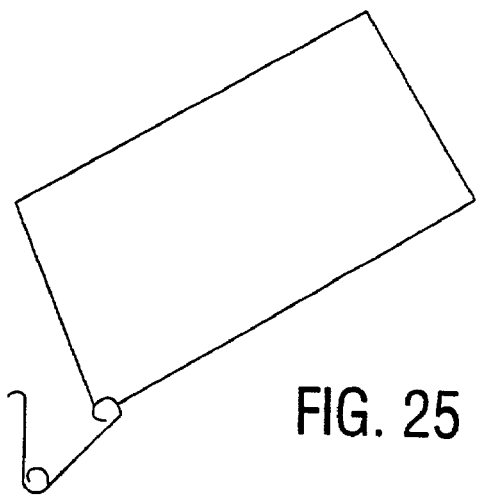
FIG. 25 is a side view of the mounting bracket of FIGS. 23 and 24 illustrating the operation of the mounting bracket.

FIGS. 23–25 illustrate a particularly preferred frame attachment member. Frame attachment member 109 is shown having an upper wall mounting member 111 and openings 113 to facilitate anchoring the frame attachment member to the inside wall of a curb inlet. A lower frame mounting member 115 having frame attachment members 117 rotatably attaches the frame to the frame attachment member. Frame mounting member 115 is rotatably attached to upper wall mounting member 111. The frame attachment member acts as a double hinge, as illustrated more particularly in FIGS. 24 and 25. During cleaning or removal of the filter body, the filter body is pulled upward and rotated relative to both the lower frame mounting member 115 and the upper wall mounting member 111.

Numerous other variations and embodiments can be discerned from the above-detailed description of the invention and illustrations thereof. All such variations are encompassed within the scope and spirit of the present invention.

What is claimed is:

1. An apparatus, comprising:
   (a) a filter body dimensioned to fit within an inlet and forming a trough obstructing at least a portion of said inlet, wherein said filter body forms a trough around the perimeter of the inside wall of said inlet;
   (b) a filter body support dimensioned and adapted to cooperatively engage with said inlet and with said filter body to substantially maintain said filter body in a pre-selected shape and position within said inlet;

(c) one or more connectors removably connecting said filter body to said filter body support; and (d) one or more fluid displaceable adsorbent containers within said filter body.

2. An apparatus, comprising:

(a) a filter body dimensioned to fit within an inlet and forming a trough obstructing at least a portion of said inlet;

(b) a filter body support dimensioned and adapted to cooperatively engage with said inlet and with said filter body to substantially maintain said filter body in a pre-selected shape and position within said inlet;

(c) one or more connectors removably connecting said filter body to said filter body support; and (d) one or more fluid displaceable adsorbent containers within said filter body, wherein said one or more fluid displaceable adsorbent containers comprise one or more adsorbent pouches removably connected to the interior of said filter body.

3. A catch basin filtration system, comprising:

a filter body dimensioned to fit within an inlet and obstructing at least a portion of said inlet, said filter body comprising a porous material, and wherein said filter body forms a trough around the perimeter of an inside wall of said inlet;

one or more fluid displaceable adsorbent containers within said filter body, wherein said one or more fluid displaceable adsorbent containers comprise one or more adsorbent pouches removably connected to the interior of said filter body;

a filter body support dimensioned and adapted to cooperatively engage with said inlet and with said filter body to substantially maintain said filter body in a pre-selected shape and position within said inlet; and one or more connectors removably connecting said filter body to said filter body support.

4. A catch basin filtration system, comprising:

a filter body dimensioned to fit within an inlet and obstructing at least a portion of said inlet, said filter body comprising a porous material;

one or more fluid displaceable adsorbent containers within said filter body; and one or more filter body support brackets dimensioned and adapted to cooperatively engage with said filter body to substantially maintain said filter body in a pre-selected shape and position within said inlet, wherein said one or more support brackets are configured to traverse the filter body in an X shape.

5. A catch basin filtration system, comprising:

(a) a filter body dimensioned to fit within an inlet and forming a trough obstructing at least a portion of said inlet;

(b) a filter body support dimensioned and adapted to cooperatively engage with said inlet and with said filter body to substantially maintain said filter body in a pre-selected shape and position within said inlet;

(c) one or more connectors removably connecting said filter body to said filter body support; and (d) one or more fluid displaceable adsorbent pouches removably connected to the interior of said filter body, whereby said one or more fluid displaceable adsorbent pouches float at or near the fluid surface within the filter body as said filter body fills with fluid.

6. The catch basin filtration system of claim 5 further comprising:

(e) a filter body positioning element situated along at least a portion of the perimeter of the filter body.

7. The catch basin filtration system of claim 6 wherein said filter body positioning element comprises an inflatable member urged against an inside wall of said inlet and securing, said filter body in position.

* * * * *